United States Patent
Lee et al.

(10) Patent No.: US 9,523,474 B2
(45) Date of Patent: Dec. 20, 2016

(54) HEADLAMP FOR VEHICLE

(71) Applicant: HYUNDAI MOBIS CO., LTD., Seoul (KR)

(72) Inventors: Hyuk Min Lee, Yongin-si (KR); Hyun Soo Lee, Yongin-si (KR); Myoung Guk Bang, Yongin-si (KR); In Heum Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 152 days.

(21) Appl. No.: 14/212,368

(22) Filed: Mar. 14, 2014

(65) Prior Publication Data

US 2015/0184821 A1    Jul. 2, 2015

(30) Foreign Application Priority Data

Dec. 27, 2013    (KR) ........................ 10-2013-0165693

(51) Int. Cl.
| | |
|---|---|
| *B60Q 1/00* | (2006.01) |
| *F21V 11/00* | (2015.01) |
| *F21S 8/10* | (2006.01) |
| *B60Q 1/04* | (2006.01) |

(52) U.S. Cl.
CPC ......... *F21S 48/1794* (2013.01); *B60Q 1/0425* (2013.01); *F21S 48/142* (2013.01); *F21S 48/1784* (2013.01)

(58) Field of Classification Search
CPC .. F21S 48/1784; F21S 48/142; F21S 48/1305; F21S 48/1794; B60Q 1/0425
See application file for complete search history.

(56) References Cited

U.S. PATENT DOCUMENTS

| 5,373,424 | A | * | 12/1994 | Ishikawa | F21S 48/1794 |
| | | | | | 362/282 |
| 5,899,559 | A | * | 5/1999 | Lachmayer | B60Q 1/1415 |
| | | | | | 362/513 |
| 6,116,764 | A | | 9/2000 | Eichhorn et al. | |
| 6,761,476 | B2 | | 7/2004 | Pascutiu | |
| 2005/0201117 | A1 | * | 9/2005 | Sugimoto | F21S 48/1794 |
| | | | | | 362/539 |
| 2006/0291229 | A1 | * | 12/2006 | Tajima | B60Q 1/0094 |
| | | | | | 362/509 |
| 2006/0291230 | A1 | * | 12/2006 | Tajima | B60Q 1/0088 |
| | | | | | 362/512 |
| 2007/0195543 | A1 | * | 8/2007 | Sugimoto | B60Q 1/0094 |
| | | | | | 362/509 |
| 2011/0249463 | A1 | * | 10/2011 | Huang | F21S 48/1778 |
| | | | | | 362/526 |

(Continued)

FOREIGN PATENT DOCUMENTS

| EP | 1710122 A1 | 10/2006 |
| JP | 2002-160576 A | 6/2002 |

(Continued)

*Primary Examiner* — Peggy Neils
*Assistant Examiner* — Alexander Garlen
(74) *Attorney, Agent, or Firm* — Knobbe Martens Olson & Bear LLP

(57) ABSTRACT

A headlamp for a vehicle is provided. The headlamp includes: a reflector which reflects light emitted from a light source; a lens which the light emitted from the light source penetrates; a lens holder which supports the lens; and a shield assembly which is provided between the reflector and the lens holder.

10 Claims, 3 Drawing Sheets

(56) References Cited

U.S. PATENT DOCUMENTS

2013/0039080 A1* 2/2013 Yamazaki ........... F21S 48/1784
362/465
2013/0258695 A1* 10/2013 Yamazaki ........... F21S 48/1784
362/513

FOREIGN PATENT DOCUMENTS

| KR | 20-2011-0006481 U | 6/2011 |
| KR | 10-2012-0050271 A | 5/2012 |
| KR | 10-2012-0131534 A | 12/2012 |

* cited by examiner

HEADLAMP FOR VEHICLE

CROSS-REFERENCE TO RELATED APPLICATIONS

This application claims priority to and the benefit of Korean Patent Application No. 10-2013-0165693 filed in the Korean Intellectual Property Office on Dec. 27, 2013, the entire contents of which are incorporated herein by reference.

TECHNICAL FIELD

The present invention relates to a headlamp for a vehicle.

BACKGROUND ART

In general, lamps for a vehicle are classified into a headlamp which is installed at a front side of a vehicle, and a tail lamp which is installed at a rear side of the vehicle. The headlamps are mounted at both sides of the front side of the vehicle, and allow a driver to secure a visual field in a driving direction when the vehicle is driven at night.

Recently, the headlamp may be configured to be moved in up and down directions or in left and right directions depending on a driving environment.

For example, in a case in which the vehicle moves along a curved road, the headlamp is rotated along the driving direction so as to help the driver to secure a visual field.

Meanwhile, as illustrated in FIG. 4, by driving a shield 30, which may partially block light emitted from a light source 10 of a headlamp 1, various beam patterns may be implemented.

However, a problem occurs in a case in which the shield 30 is provided inside a reflector 20, and a shield actuator 43, which drives the shield 30, is provided outside the reflector 20, or at a lens holder 50.

First, because the shield 30 and the shield actuator 43 are separately assembled, in a case in which errors, which occur during assembly processes, are accumulated, relative positions of the shield 30 and the reflector 20 deviate from each other, and as a result, optical tolerance may be excessively generated. Since the shield actuator 43 is provided outside the reflector 20, there is a problem in that an overall size of the headlamp is increased. Shaft connection between the shield actuator 43 and the shield 30 is incorrectly performed, and thus there is a problem in that power transmission is insufficient.

LITERATURE OF RELATED ART

Patent Literature

Korean Patent Application Publication No. 10-2012-0050271 (May 18, 2012)

SUMMARY OF THE INVENTION

Embodiments of the present invention are directed to a headlamp for a vehicle, in which power transmission between a shield actuator and a shield is smoothly performed.

Furthermore, the embodiments of the present invention are directed to a headlamp for a vehicle, which has a reduced size.

Furthermore, the embodiments of the present invention are directed to a headlamp for a vehicle, which may reduce optical tolerance.

An embodiment of the present invention provides a headlamp for a vehicle, including: a reflector which reflects light emitted from a light source; a lens which the light emitted from the light source penetrates; a lens holder which supports the lens; and a shield assembly which is provided between the reflector and the lens holder.

The shield assembly may include: a shield housing which is connected to the reflector; a shield rotation shaft which is rotatably connected to the shield housing; a shield which is provided on the shield rotation shaft; and a shield actuator which rotates the shield rotation shaft.

The shield actuator may include: an electric motor; and an output shaft which is connected to the electric motor, in which the output shaft is parallel to the shield rotation, shaft.

The output shaft may be engaged with the shield rotation shaft.

A power transmission device may be provided between the output shaft and the shield rotation shaft.

The power transmission device may include: a first gear which is engaged with the output shaft; and a second gear which is formed on the shield rotation shaft and engaged with the first gear.

The headlamp for a vehicle may further include a first frame which accommodates the reflector, in which the shield assembly is connected to the first frame.

The shield assembly may be connected to the lens holder.

The first frame may include a first connecting portion, the shield assembly may include a second connecting portion, the lens holder may include a third connecting portion, and the first connecting portion may be sequentially connected to the second connecting portion and the third connecting portion.

The first connecting portion may include a coupling projection, the second connecting portion may include a through hole, the third connecting portion may include an insertion groove, and the coupling projection may penetrate the through hole and may be inserted into the insertion groove.

The headlamp for a vehicle may further include a second frame which accommodates the first frame, in which the first frame is rotatably connected to the second frame.

The headlamp for a vehicle may further include a swivel assembly which applies rotational force to the first frame, in which the swivel assembly includes: a swivel actuator; and a swivel shaft which is connected to the swivel actuator, in which the swivel shaft penetrates the second frame and is connected to the first frame.

The first frame may include a swivel shaft connecting portion that is connected to the swivel shaft, and the second frame may include a swivel shaft through hole which the swivel shaft penetrates.

The headlamp for a vehicle may further include a housing which is connected to a vehicle body, in which the second frame is fixed to the housing.

A maximum width of the shield assembly may be equal to or narrower than a maximum width of the reflector.

According to the headlamp for a vehicle according to the embodiment of the present invention, since the shield assembly is provided inside the reflector, the shield actuator and the shield rotation shaft may be smoothly engaged with each other.

According to the headlamp for a vehicle according to the embodiment of the present invention, since the shield actuator is provided inside the reflector, a size of the headlamp may be reduced.

According to the headlamp for a vehicle according to the embodiment of the present invention, since the shield actuator is provided inside the reflector, relative positions of a reflection surface and a shield do not deviate from each other, thereby reducing optical tolerance.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
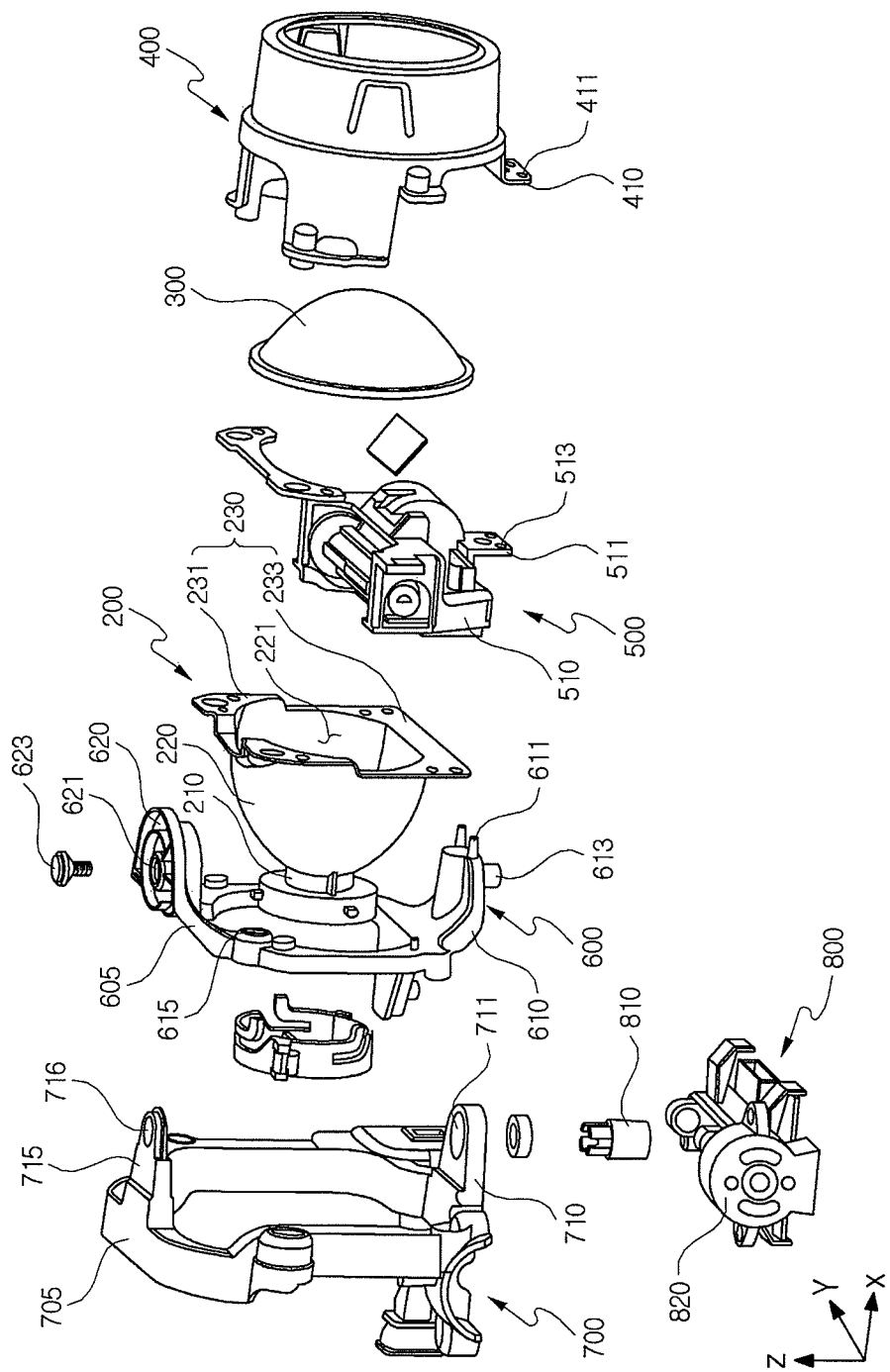
FIG. 1 is an exploded perspective view illustrating a headlamp for a vehicle according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, embodiments of the present invention will be described in detail with reference to the drawings. Substantially the same constituent elements are indicated by the same reference numerals in the following description and the accompanying drawings, so that a repeated description will be omitted. In describing the embodiments of the present invention, well-known related functions or configurations will not be described in detail since the detailed description for the well-known related functions or configurations may unnecessarily obscure the understanding of the present invention.

It should be understood that when one constituent element referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening elements present.

In the present specification, singular expressions include plurals unless they have definitely opposite meanings. The mean of "comprises" and/or "comprising" used in this specification does not exclude the existence or addition of aforementioned constituent elements, steps, operations, and/ or device, and one or more other constituent elements, steps, operations, and/or devices.

Figure 2:
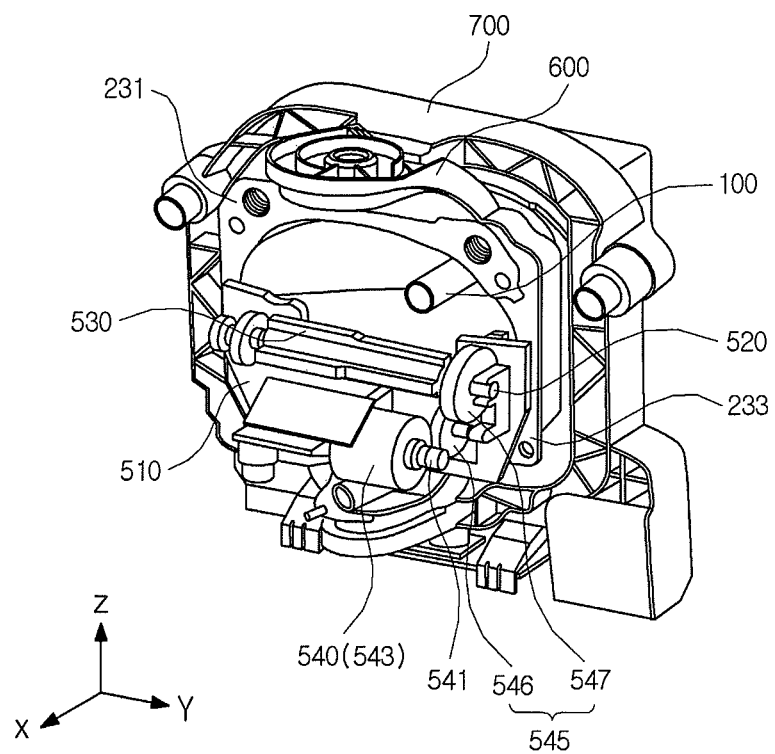
FIG. 2 is a partially perspective view illustrating the headlamp of FIG. 1.
Figure 3:
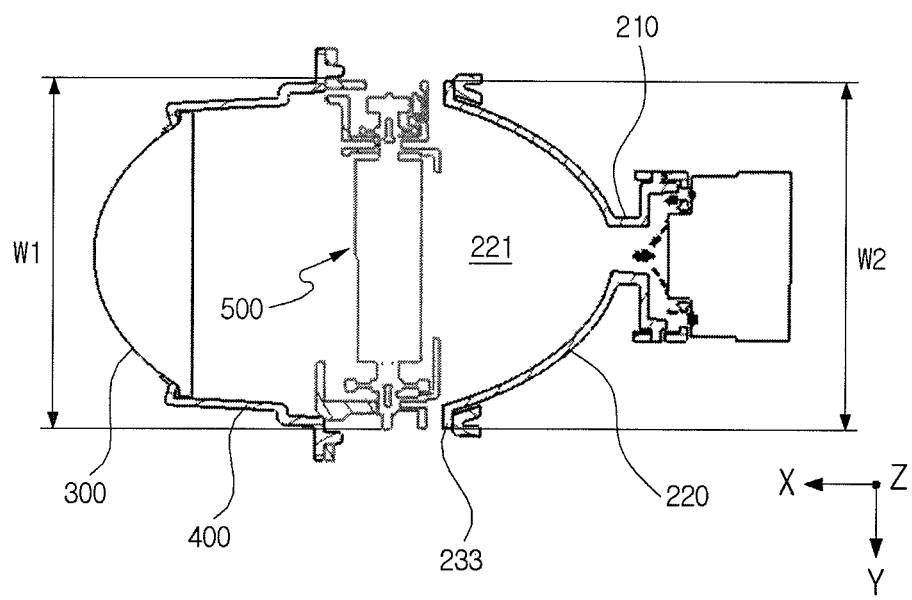
FIG. 3 is a schematic cross-sectional view illustrating the headlamp of FIG. 1.
Figure 4:
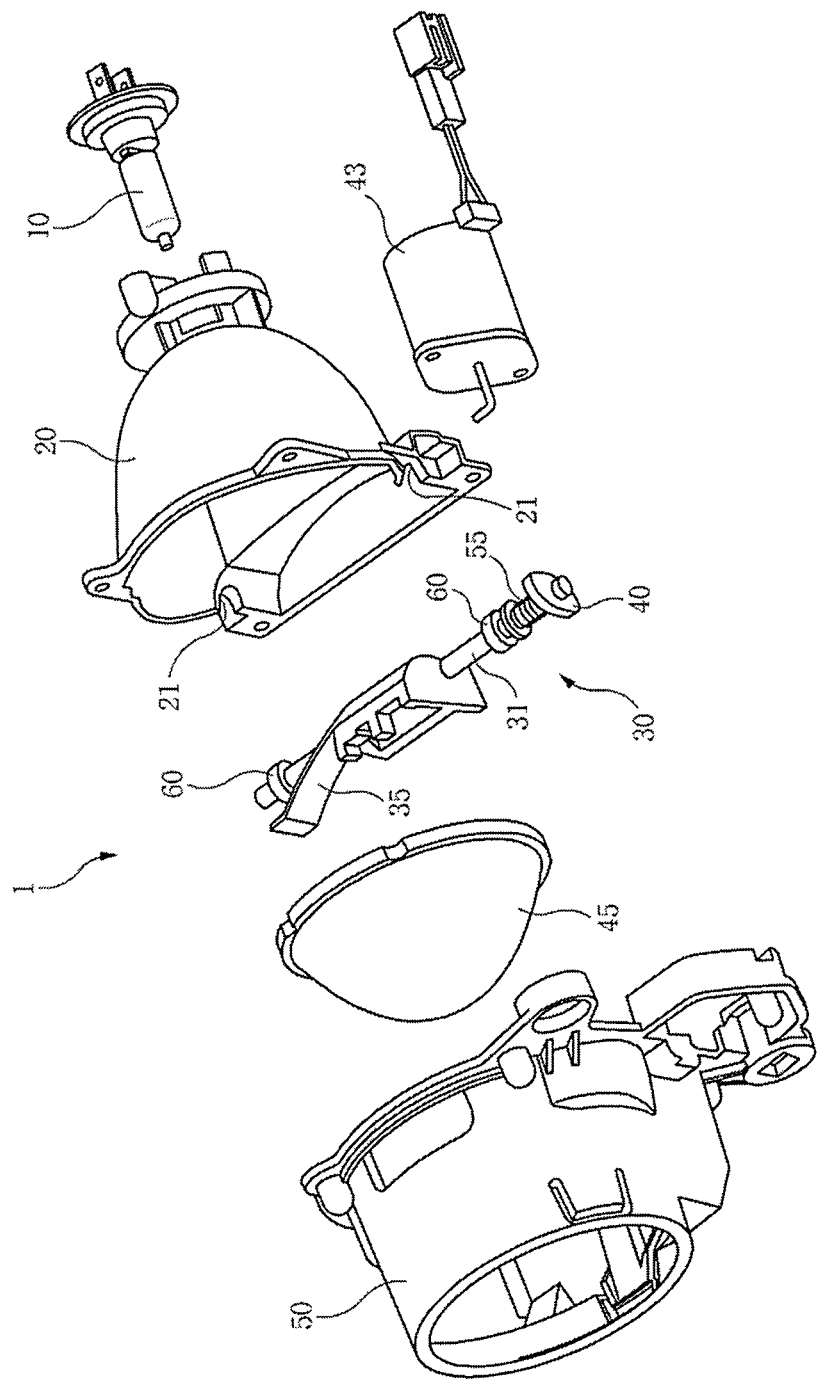
FIG. 4 is an exploded perspective view illustrating a headlamp for a vehicle according to the related art.

FIG. 1 is an exploded perspective view illustrating a headlamp for a vehicle according to an embodiment of the present invention, FIG. 2 is a partially perspective view illustrating the headlamp of FIG. 1, and FIG. 3 is a schematic cross-sectional view illustrating the headlamp of FIG. 1.

Referring to FIGS. 1 to 3, a headlamp for a vehicle according to an embodiment of the present invention includes a light source 100, a reflector 200, a lens 300, a lens holder 400, a shield assembly 500, a first frame 600, a second frame 700, and a swivel assembly 800.

The light source 100 refers to a device which emits light, and for example, may be a light emitting diode (LED) or a halogen lamp. However, the present invention is not limited thereto, and the light source 100 may be any other device as long as the device may emit light.

The reflector 200 serves to reflect light emitted from the light source 100, and includes a light source mounting portion 210, a side wall portion 220, and a flange portion 230.

The light source 100 may be mounted on the light source mounting portion 210. For example, the light source mounting portion 210 may be formed in an approximately cylindrical shape.

The side wall portion 220 has a predetermined thickness, and extends from the light source mounting portion 210 so as to form an internal space 221. A cross section of the side wall portion 220 in a lateral direction (in a Y-axis direction in the drawing) is formed in a circular shape, and a diameter of the side wall portion 220 is increased as the side wall portion 220 becomes farther away from the light source mounting portion 210 (toward an X-axis direction in the drawing). Therefore, a cross section of the side wall portion 220 in a longitudinal direction (the X-axis direction in the drawing) is formed in an approximate parabola shape. However, the present invention is not limited thereto, and the reflector may have various shapes as long as the reflector may reflect light emitted from the light source.

The flange portion 230 is formed to extend at an edge of the side wall portion 220. The flange portion 230 may include a first flange portion 231, and a second flange portion 233. The first flange portion 231 and the second flange portion 233 may be provided at positions opposite to each other based on a center of the internal space 221 of the side wall portion 220. A pair of first flange portions 231 may be disposed to be symmetric to each other. Meanwhile, an edge of the second flange portion 233 may have an approximately rectangular shape. However, the present invention is not limited thereto. On the other hand, the reflector 200 may be fixed to the first frame 600 through the first flange portion 231, and the shield assembly 500 may be fixed to the second flange portion 233.

The lens 300 allows light, which is emitted from the light source 100, to penetrate the lens 300. The lens 300 may be made of a general light transmissive material. The lens 300 is mounted on the lens holder 400.

The shield assembly 500 is provided between the reflector 200 and the lens holder 400, For example, the shield assembly 500 may be formed in a shape that is accommodated in the internal space 221 of the reflector 200. That is, a width of the shield assembly 500 may be equal to or narrower than a width of the reflector 200. For example, as illustrated in FIG. 3, a maximum width W1 of the shield assembly 500 may be equal to or smaller than a maximum width W2 of the reflector 200, that is, a length which connects both edges of the second flange portion 233.

Meanwhile, the shield assembly 500 includes a shield housing 510, a shield rotation shaft 520, a shield 530, and a shield actuator 540.

The shield housing 510 forms an external shape of the shield assembly 500. Each constituent element of the shield assembly 500 may be mounted or embedded in the shield housing 510.

The shield housing 510 may be fixed to the reflector 200. For example, the shield housing 510 may be fixed to the second flange portion 233 of the reflector 200. The shield housing 510 is also connected to the lens holder 400 and the first frame 600 through a third flange portion 511, and a description thereof will be described below.

The shield rotation shaft 520 is formed in a bar shape, and both ends thereof are rotatably connected to the shield housing 510.

The shield 530 is provided on the shield rotation shaft 520. The shield 530 may have a stepped portion that is formed at an edge of the shield 530 so as to partially block light emitted from the light source 100. Meanwhile, the shield 530 may be formed integrally with the shield rotation shaft 520.

The shield actuator 540 is a device that rotates the shield rotation shaft 520. The shield actuator 540 includes an output shaft 541, and an electric motor 543. The output shaft 541 transmits rotational force to the shield rotation shaft 520, and the electric motor 543 rotates the output shaft 541. For example, the output shaft 541 may be parallel with the shield rotation shaft 520. The shield actuator 540 may be controlled by an electronic control unit (not illustrated) of a vehicle.

Meanwhile, a power transmission device 545 is provided between the shield rotation shaft 520 and the output shaft 541. The power transmission device 545 includes a first gear 546, and a second gear 547, which are engaged with each other. The first gear 546 is engaged with the output shaft 541, and the second gear 547 is formed on the shield rotation shaft 520. Therefore, the rotational force of the output shaft 541 is transmitted to the shield rotation shaft 520 through the first gear 546 and the second gear 547 so as to rotate the shield rotation shaft 520. However, the present invention is not limited thereto, and the shield rotation shaft 520 and the output shaft 541 may be directly engaged with each other.

The first frame 600 includes a first main body 605, a first connecting portion 610, a second connecting portion 615, and a third connecting portion 620.

The first main body 605 may be formed in a hollow shape so as to accommodate the reflector 200.

The first connecting portion 610 extends from the first main body 605, and is connected to the shield assembly 500 and the lens holder 400. A coupling projection 611 may be provided on the first connecting portion 610.

Meanwhile, the shield assembly 500 includes the third flange portion 511 that extends from the shield housing 510, and a through hole 513 is formed in the third flange portion 511. On the other, hand, an insertion groove 411 is formed in a fourth flange portion 410 that extends from the lens holder 400.

Therefore, the coupling projection 611 of the first connecting portion 610 penetrates the through hole 513 of the third flange portion 511, and is inserted into the insertion groove 411 of the fourth flange portion 410, such that the first frame 600, the shield assembly 500, and the lens holder 400 may be connected.

On the other hand, the first connecting portion 610 is rotatably connected to the second frame 700. A description thereof will be described below.

Meanwhile, the second connecting portion 615 is a portion to which the first flange portion 231 of the reflector 200 is fixed. That is, the first flange portion 231 is fixed to the second connecting portion 615 while the reflector 200 is accommodated in, the first main body 605, such that the reflector 200 may be fixed to the first frame 600.

The third connecting portion 620 extends from the first main body 605 at a position opposite to the first connecting portion 610. The first frame 600 is rotatably connected to the second frame 700 through the third connecting portion 620. A description thereof will be described below.

The second frame 700 includes a second main body 705, a fourth connecting portion 710, and a fifth connecting portion 715.

The second main body 705 may be formed in a hollow shape so as to accommodate the first frame 600.

The fourth connecting portion 710 and the fifth connecting portion 715 extend from the second main body 705 at positions opposite to each other. The first frame 600 is rotatably connected to the second frame 700 through the fourth connecting portion 710 and the fifth connecting portion 715. Specifically, the fourth connecting portion 710 is connected to the first connecting portion 610 of the first frame 600, and the fifth connecting portion 715 is connected to the third connecting portion 620.

The relative rotation of the first frame 600 with respect to the second frame 700 refers to swiveling, and this may be performed by the swivel assembly 800. The swivel assembly 800 includes a swivel shaft 810, and a swivel actuator 820. The swivel shaft 810 is a rotatable power transmission shaft, and the swivel actuator 820 rotates the swivel shaft 810. The swivel actuator 820 may include an electric motor (not illustrated).

A swivel shaft through hole 711 is provided in the fourth connecting portion 710, and a swivel shaft connecting portion 613 is provided on the first connecting portion 610 of the first frame 600. The swivel shaft 810 may penetrate the swivel shaft through hole 711, and be connected to the swivel shaft connecting portion 613. When the swivel actuator 820 is driven and the swivel shaft 810 is rotated, rotational force is transmitted to the swivel shaft connecting portion 613. Since the swivel shaft connecting portion 613 may be rotated in the swivel shaft through hole 711, the first frame 600 may be relatively rotated with respect to the second frame 700.

A first pin insertion hole 716 is provided in the fifth connecting portion 715, and a second pin insertion hole 621 is provided in the third connecting portion 620 of the first frame 600. The fifth connecting portion 715 and the third connecting portion 620 may be rotatably connected by a connecting pin 623 that simultaneously penetrates the first pin insertion hole 716 and the second pin insertion hole 621.

As described above, the first frame 600 and the second frame 700 are rotatably connected at two positions. That is, the swivel shaft connecting portion 613 of the first frame 600 is inserted into the swivel shaft through hole 711 of the second frame 700, and the third connecting portion 620 of the first frame 600 is connected to the fifth connecting portion 715 of the second frame 700.

However, if rotation axes do not coincide with each other at the two positions, the relative rotation of the first frame 600 and the second frame 700 is not smoothly performed, and related constituent components may be damaged. Therefore, the rotation axes need to coincide with each other at the two positions. That is, the first pin insertion hole 716, the second pin insertion hole 621, the swivel shaft through hole 711, the swivel shaft connecting portion 613, and the swivel shaft 810 are present on a straight line.

Meanwhile, the second frame 700 may be fixed to a housing (not illustrated). The housing is connected to a vehicle body, and therefore, the second frame 700 is fixed unlike the first frame 600 that is rotatable.

As described above, according to the embodiment of the present invention, the shield assembly 500 is provided between the reflector 200 and the lens holder 400, that, is, inside the reflector 200. In other words, the shield 530 and the shield actuator 540 are provided together inside the reflector 200. As such, since the shield actuator 540 is provided inside the reflector 200, a space may be saved, and an overall size of the headlamp may be reduced.

According to the present embodiment, since the shield rotation shaft 520 and the shield actuator 540 are provided together inside the reflector 200, shaft connection is accurately performed, such that power transmission may be smoothly performed. According to the present embodiment, since the shield rotation shaft 520 and the shield actuator 540 are simultaneously assembled to form the shield assembly 500, an error may be reduced during an assembly process, and optical tolerance may also be reduced.

As described above, the embodiments have been described and illustrated in the drawings and the specification. The embodiments were chosen and described in order to explain certain principles of the invention and their practical application, to thereby enable others skilled in the art to make and utilize various embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such, changes, modifications, variations and other uses and applications which do not depart from the spirit and scope of the invention are deemed to be covered by the invention which is limited only by the claims which follow.

What is claimed is:

1. A headlamp for a vehicle, comprising:
   a first frame comprising two opposing swivel connection portions through which a swivel axis passes;
   a second frame fixed to a vehicle body, the first frame being connected with the second frame via the two opposing swivel connection portions such that the first frame is capable of swiveling about the swivel axis relative to the second frame;
   comprising a reflecting surface configured to reflect light beams thereon, a lens placed in front of the reflector for receiving light beams reflected on the reflecting surface, the lens configured to redirect incident light beams as they pass therethrough;
   a lens holder holding the lens; and
   a shield assembly comprising a shield shaft, at least one shield attached to the shield shaft, and a motor operably connected to the shield shaft for rotating the shield shaft such that the at least one shield selectively blocks at least part of light beams traveling from the reflector toward the lens as the shield shaft rotates;
   wherein the shield assembly is located within a horizontal extension of the reflector in a horizontal direction perpendicular to the swivel axis such that the motor of the shield assembly is located within the horizontal extension of the reflector when viewing the motor from the lens in a direction perpendicular to the swivel axis and the horizontal direction, wherein the motor and the shield shaft are arranged such that the motor's shaft extends generally parallel to the shield shaft and below the shield shaft;
   wherein the shield assembly is provided between the reflector and the lens holder and is fixed to the first frame along with the reflector and the lens holder such that the shield assembly including the shield and the motor swivels together with the reflector and the lens holder about the swivel axis relative to the second frame.

2. The headlamp of claim 1, wherein the shield assembly further comprises a shield frame to which the motor is fixed, wherein the shield frame is integrated with the first frame.

3. The headlamp of claim 1, wherein the shield shaft is engaged with the motor by mechanical gears.

4. The headlamp of claim 3, wherein the mechanical gears comprise:
   a first gear engaged with the shield shaft; and
   a second gear engaged with the first gear.

5. The headlamp of claim 1, wherein the first frame includes a first connecting portion, the shield assembly includes a second connecting portion, the lens holder includes a third connecting portion, wherein the reflector, the shield assembly and the lens holder are fixed to the first frame such that the first connecting portion of the first frame is sequentially connected to the second connecting portion of the shield assembly and the third connecting portion of the lens holder.

6. The headlamp of claim 5, wherein the first connecting portion includes a coupling projection, the second connecting portion includes a through hole, the third connecting portion includes an insertion groove, and the coupling projection penetrates the through hole and is inserted into the insertion groove.

7. The headlamp of claim 1, further comprising:
   a frame swivel assembly operably connected to the first frame and configured to move the first frame for swiveling about the swivel axis,
   wherein the frame swivel assembly includes:
   a swivel actuator; and
   a swivel shaft connected to the swivel actuator.

8. The headlamp of claim 7, wherein the first frame includes a swivel shaft connecting portion connected to the swivel shaft, and the second frame includes a through hole through which the swivel shaft penetrates.

9. The headlamp of claim 8, further comprising:
   a lamp housing connected to the vehicle body,
   wherein the second frame is fixed to the vehicle body via the lamp housing.

10. The headlamp of claim 1, wherein the reflector has a width in a direction when viewed along the swivel axis, wherein the shield assembly has a width in the direction that is equal to or narrower than the width, of the reflector.

* * * * *